3,203,167
MEANS AND METHOD OF UTILIZING SOLAR ENERGY
Leon Green, Jr., Corona del Mar, Calif.
(5117 Westpath Way, Washington 16, D.C.)
Filed July 6, 1962, Ser. No. 208,073
3 Claims. (Cl. 60—26)

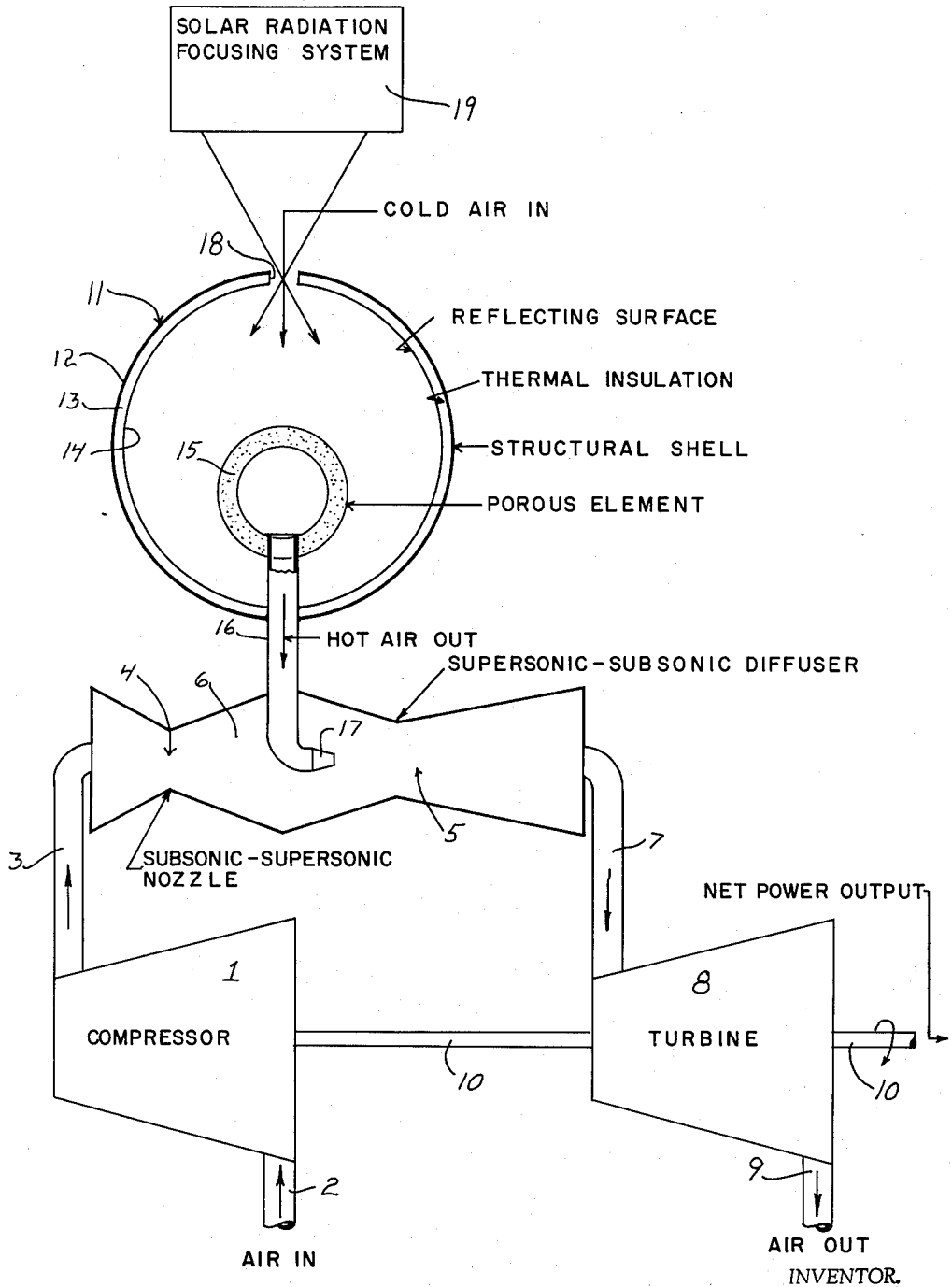

The objects of the invention are as follows:

First, to provide a means and method of utilizing solar energy wherein a primary gas is compressed by a compressor, then passed through a jet pump, and then expanded through a turbine operatively connected with the compressor, and wherein solar energy is utilized to heat a secondary gas to a high temperature for entrainment in the primary gas as it passes through the jet pump, thereby to raise the enthalpy of the resulting stream so that the turbine not only may drive the compressor but will also produce useful power.

Second, to provide a means and method of utilizing solar energy wherein solar radiation is absorbed by a porous wall structure so that the wall is heated to a high temperature, and the secondary gas is diffused through the wall in intimate heat transfer with the internal surfaces thereof, so that the secondary gas is also raised to a high temperature.

Third, to provide a means and method of utilizing solar energy wherein a jet pump of the type having a subsonic-supersonic nozzle and a supersonic-subsonic diffuser is so arranged that a zone of low pressure is established in the primary gas stream into which the secondary gas is introduced.

Fourth, to provide a means and method of utilizing solar energy wherein the highly heated secondary gas is maintained under low pressure conditions and may have a short path of travel to the jet pump so as to minimize the problem of containing and transporting the high temperature secondary gas.

With the above and other objects in view, as may appear hereinafater, reference is directed to the accompanying drawing in which:

The figure is a diagrammatical view showing the means and illustrating the method of utilizing solar energy.

The means of utilizing solar energy includes a compressor 1, preferably a centrifugal compressor, having an air inlet 2 and a compressed air outlet communicating with a conduit 3. The conduit 3 discharges into the subsonic intake end of a subsonic-supersonic nozzle 4. The discharge end of the nozzle 4 is joined to the intake end of a supersonic-subsonic diffuser 5. The connected end of the diffuser 5 forms a chamber 6 through which air is caused to flow at supersonic velocities and at subatmospheric pressures. The nozzle 4 and diffuser 5 considered as a unit are similar to the conventional supersonic wind tunnel, the design of which has been well established.

The air, which may be designated "primary" air, enters the nozzle 4 at subsonic velocities and at the pressures established by the compressor 1, and discharges from the diffuser also at subsonic velocities and at pressures corresponding to the compressor outlet pressure, assuming that no secondary air has been added.

The air discharged from the diffuser 5 passes through a conduit 7 to the intake end of a turbine 8, then through the turbine, and discharges through an exhaust 9. The turbine 8 and compressor 1 are mounted on a common shaft 10 so that the turbine 8 may drive the compressor 1.

A solar heater 11 is provided which includes a shell 12 having an internal lining of insulation 13 and an internal reflecting surface 14. Disposed within the shell 12 is a hollow, porous, wall element 15. The porous wall element may be in the form of a hollow sphere, or may be cylindrical. The shell 12 may also be cylindrical or spherical, or may be otherwise shaped. A hot air conduit 16 leads from the interior of the porous wall element 15 into the chamber 6 and terminates in an injection nozzle or port 17.

The shell 12 is provided with one or more apertures 18 which may be located anywhere in the wall thereof. Outwardly of the aperture, or apertures—in case more than one is provided—is a focusing mirror or lens system 19, indicated by box diagram, so arranged that its focal point is located in the vicinity of the aperture 18.

The method of utilizing solar energy is as follows:

Primary air is drawn into the compressor 1, compressed, and delivered to the nozzle 4. This air, on entering the chamber 6 formed by the joined ends of the nozzle and diffuser 5, is caused to flow at supersonic velocities and at a pressure substantially below atmospheric pressure. As a consequence, the primary air draws in secondary air through the conduit 16.

Solar energy focused by the lens 19 enters the shell 12, and a portion of this solar radiation directly contacts the porous wall element 15 so that the element is heated. The remaining portion of the solar radiation strikes the reflecting surface 14 and is reflected therefrom either to another portion of the reflecting surface or to the porous wall element 15. Eventually, most of the solar radiation which enters the shell 12 strikes the porous wall element 15 so as to further heat this element. This condition will obtain irrespective of the internal shape of the reflecting surface 14 and the shape of the porous wall element 15 therein. It should be understood, however, that some configurations of the reflecting surface 14 and the porous wall element 15 are more efficient than others, requiring less reflection from wall surface to wall surface before impingement on the porous wall element 15.

The porous wall element 15 is formed of ceramic material or of a ceramic metal capable of standing extremely high temperatures. However, the temperature rise is limited by the continuous flow of air through the porous wall of the porous wall element 15. This air, which may be termed "secondary" air, is heated so that when injected into the primary air flowing through the chamber 6 the enthalpy of the resulting stream is raised.

The mixed primary and secondary air, having greater energy than the compressed air delivered by the compressor 1, is capable of operating the turbine 8 so that the turbine in turn can drive the compressor 1 and have additional power available for driving other apparatus connected with the shaft 10.

By way of illustration, but not of limitation, the air entering the compressor 1 may be in the range of 100° F., the air flowing through the conduit 3 may have a temperature of 620 F. when compressed from 15 to 150 p.s.i. The primary static air pressure in the chamber 6 may be below atmospheric pressure, but its velocity may have a Mach number of the order of 3 or higher.

In flowing through the porous element 15, the secondary air may be heated to temperatures ranging up to the order of 4000° F. and enter the hot air conduit 16 at below atmospheric pressure.

The mixed primary and secondary air passing from the diffuser 5 through the conduit 7 to the intake of the turbine 8 may be in the range of 1000° F. and have a pressure close to the 150 p.s.i. level existing in the conduit 3. Any residual energy in the air discharged from the turbine 8 is available for useful work, should this be desired.

While a particular embodiment of this invention has been shown and described, it is not intended to limit the same to the exact details of the construction set forth, and it embraces such changes, modifications, and equiva-

What is claimed is:

1. Means for producing useful power comprising: a compressor having an outlet for compressed gas; a turbine for driving said compressor; nozzle means connected to said outlet for directing compressed gas to flow in a stream at high velocity; means for heating and directing a secondary gas into said high velocity stream adjacent said nozzle; diffuser means for confining said stream of mixed gases to flow at reduced velocity and for directing the same to said turbine to drive the same, said means for heating and directing said secondary gas comprising a porous wall exposed on one side to ambient atmosphere and conduit means communicating with the other side thereof and extending to said position adjacent said nozzle; and means for concentrating solar energy on said one side of said porous wall.

2. Means as defined in claim 1 wherein said porous wall comprises a hollow body of porous heat absorbing material defining an internal chamber, said conduit means communicating with said chamber, and said means for concentrating solar energy being arranged to direct solar energy to substantially the entire outer surface of said hollow body.

3. A method of producing useful power; comprising the steps of: compressing a primary gas; causing said primary gas to flow through a predetermined zone at high velocity and low static pressure; heating a secondary gas at a pressure higher than said low static pressure; directing said heated secondary gas into said zone to mix and flow with said primary gas; slowing said mixed primary and secondary gases to a lower velocity to raise the static pressure while maintaining the temperature thereof above the starting temperature of said primary gas; and expanding said gases while extracting useful work therefrom.

References Cited by the Examiner
UNITED STATES PATENTS

| | | | |
|---|---|---|---|
| 900,434 | 10/08 | Sigfried | 230—95 |
| 1,250,160 | 12/17 | Good. | |
| 1,599,481 | 9/26 | Marcuse. | |
| 2,457,594 | 12/48 | Nettel et al. | |
| 2,998,005 | 8/61 | Johnston | 126—270 |

JULIUS E. WEST, *Primary Examiner.*